United States Patent
Peirce

(10) Patent No.: US 9,276,736 B2
(45) Date of Patent: Mar. 1, 2016

(54) CONNECTION KEY DISTRIBUTION

(71) Applicant: General Motors LLC, Detroit, MI (US)

(72) Inventor: Kenneth L. Peirce, Grosse Pointe Farms, MI (US)

(73) Assignee: General Motors LLC, Detroit, MI (US)

(*) Notice: Subject to any disclaimer, the term of this patent is extended or adjusted under 35 U.S.C. 154(b) by 157 days.

(21) Appl. No.: 13/804,431

(22) Filed: Mar. 14, 2013

(65) Prior Publication Data

US 2014/0270158 A1    Sep. 18, 2014

(51) Int. Cl.
| | |
|---|---|
| H04L 9/08 | (2006.01) |
| H04W 12/04 | (2009.01) |
| H04L 9/00 | (2006.01) |
| H04L 29/08 | (2006.01) |

(52) U.S. Cl.
CPC ............ *H04L 9/0819* (2013.01); *H04W 12/04* (2013.01); *H04L 9/006* (2013.01); *H04L 67/12* (2013.01); *H04L 2209/84* (2013.01)

(58) Field of Classification Search
None
See application file for complete search history.

(56) References Cited

U.S. PATENT DOCUMENTS

| | | | |
|---|---|---|---|
| 7,908,272 B2* | 3/2011 | Chang et al. ................ 707/736 |
| 2004/0003250 A1* | 1/2004 | Kindberg .............. G06F 21/445 |
| | | | 713/171 |
| 2004/0185842 A1* | 9/2004 | Spaur et al. .................... 455/420 |
| 2007/0086579 A1* | 4/2007 | Lorello et al. ................... 379/45 |
| 2007/0136573 A1* | 6/2007 | Steinberg ...................... 713/155 |
| 2008/0294302 A1* | 11/2008 | Basir ................................ 701/2 |
| 2010/0114488 A1* | 5/2010 | Khamharn et al. ........... 701/300 |
| 2010/0235891 A1* | 9/2010 | Oglesbee et al. .................. 726/5 |
| 2011/0087870 A1* | 4/2011 | Spangler et al. .................. 713/2 |
| 2012/0071140 A1* | 3/2012 | Oesterling et al. ......... 455/414.1 |
| 2013/0179005 A1* | 7/2013 | Nishimoto et al. ............... 701/2 |
| 2013/0278622 A1* | 10/2013 | Sun et al. ....................... 345/589 |
| 2014/0013100 A1* | 1/2014 | Menzel et al. ................ 713/150 |
| 2014/0068713 A1* | 3/2014 | Nicholson et al. ................ 726/3 |
| 2014/0079217 A1* | 3/2014 | Bai et al. ........................ 380/270 |
| 2014/0096217 A1* | 4/2014 | Lehmann .......................... 726/7 |
| 2014/0256304 A1* | 9/2014 | Frye et al. ..................... 455/418 |
| 2015/0207796 A1* | 7/2015 | Love ...................... H04L 63/10 |
| | | | 600/345 |

OTHER PUBLICATIONS

Prabu et al, "Telematics Based Security System", Apr. 2011, International Journal of Wireless & Mobile Networks (IJWMN), vol. 3, No. 2, p. 138-147.*

* cited by examiner

*Primary Examiner* — Christopher Revak
(74) *Attorney, Agent, or Firm* — Christopher DeVries; Reising Ethington P.C.

(57) ABSTRACT

A system and a method implementing the method pertaining to securely providing a mobile device with a cryptographic key in a vehicle. The method includes generating a cryptographic key pair. The key pair may include at least a first cryptographic key and a second cryptographic key. The method may further include creating a label using a scannable image readable by a mobile device; the scannable image may be based on the second cryptographic key. And the method may include providing the label to the vehicle for displaying the scannable image.

13 Claims, 3 Drawing Sheets

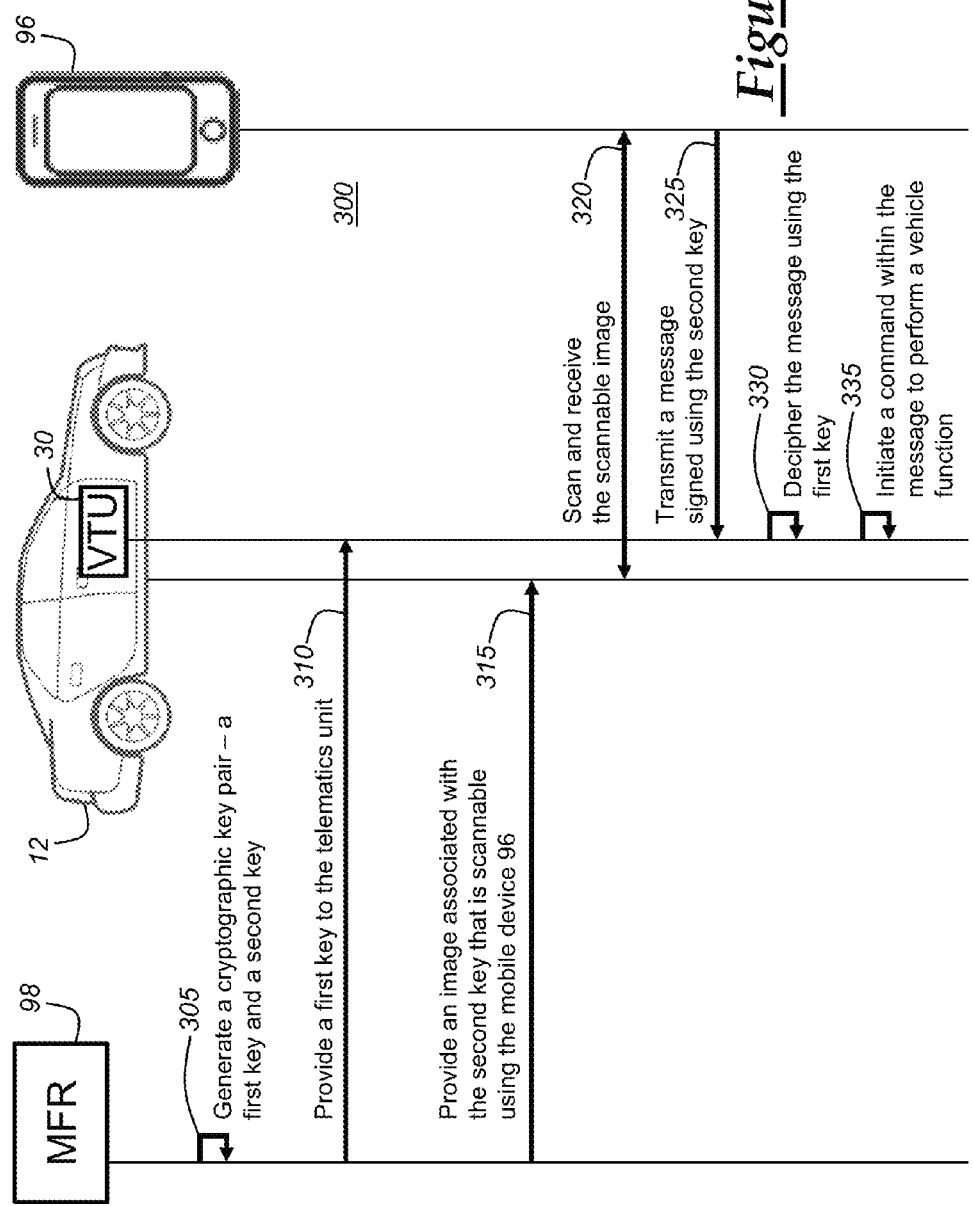

CONNECTION KEY DISTRIBUTION

TECHNICAL FIELD

The present invention relates to secure communication between a vehicle and a mobile device, and more specifically distributing a secret key to the mobile device for communicating with the vehicle.

BACKGROUND

Transport Layer Security (TLS) is a known technology used in digital networks to establish and carry out secure communication between two entities. The communicating entities can be devices such as computers or other electronic apparatuses capable of digital communication, and the two entities may be communicating as peers or in a client/server configuration. TLS is implemented using digital certificates which, through public key cryptography (i.e., using public key infrastructure, PKI) and a common trusted entity, enable one or both of the communicating entities to authenticate the other and enable the two entities to exchange information confidentially. Secure Socket Layers (SSL) is an earlier form or predecessor of TLS that has been widely used over the Internet.

TLS is commonly used in TCP/IP networks using X.509 digital certificates which are typically issued by a trusted third party certificate authority (CA) and signed with the CA's private key. The holder (subject) of the certificate can then use it to authenticate itself to other entities. The associated CA public key is distributed to those entities as a part of a self-signed certificate. Authentication of a received digital certificate then involves using the CA's public key to decrypt the digital signature and compare the result to the contents actually contained in the certificate. More specifically, when the certificate is originally signed, a hash is performed of the certificate's contents and the result is encrypted using the CA's private key. This encrypted result is used as the digital signature and is appended to the certificate. Then, to authenticate, a recipient of the certificate uses the public key to decrypt the hash, and then compares this decrypted hash result with its own hash of the received certificate data items that it takes using the same hash function. If the two results match, then this indicates that the contents of the certificate are authentic. That authenticated content includes the certificate holder's (subject's) identity and public key so that the recipient of the certificate can now know that the identity is authentic and can communicate confidentially with the subject using its public key.

SUMMARY

According to an embodiment of the invention, there is provided a method of securely providing a mobile device with a cryptographic key in a vehicle. The method includes generating a cryptographic key pair. The key pair may include at least a first cryptographic key and a second cryptographic key. The method may further include creating a label using a scannable image readable by a mobile device; the scannable image may be based on the second cryptographic key. And the method may include providing the label to the vehicle for displaying the scannable image.

According to another embodiment of the invention, there is provided a method of secure communication between a vehicle and a mobile device. The method includes generating a cryptographic key pair. The key pair may include at least a first cryptographic key and a second cryptographic key. The method may include providing the first cryptographic key to a vehicle telematics unit (VTU) and providing within the vehicle a scannable image associated with the second cryptographic key. The scannable image may be readable by the mobile device using a software application installed on the mobile device. The method may include receiving a message from the mobile device that is signed using the second cryptographic key. This may occur after the mobile device has scanned the scannable image and extracted the second key. And the method may include deciphering the message using the first cryptographic key.

BRIEF DESCRIPTION OF THE DRAWINGS

One or more embodiments of the invention will hereinafter be described in conjunction with the appended drawings, wherein like designations denote like elements, and wherein:

FIG. 3 is a flow diagram depicting another exemplary embodiment.

DETAILED DESCRIPTION OF THE ILLUSTRATED EMBODIMENT(S)

The system and methods described below pertain to secure communications between a vehicle and a cellular or mobile device. One way to provide a secure communication between the vehicle and mobile device is to encrypt messages transmitted between the entities. This may be accomplished where at least one of the entities holds or keeps a private key. The described methods specifically pertain, at least in part, to providing a private key to the mobile device and thereafter using the provided private key. The system and operating environment are discussed prior to a discussion of the methods.

Communications System

Figure 1:
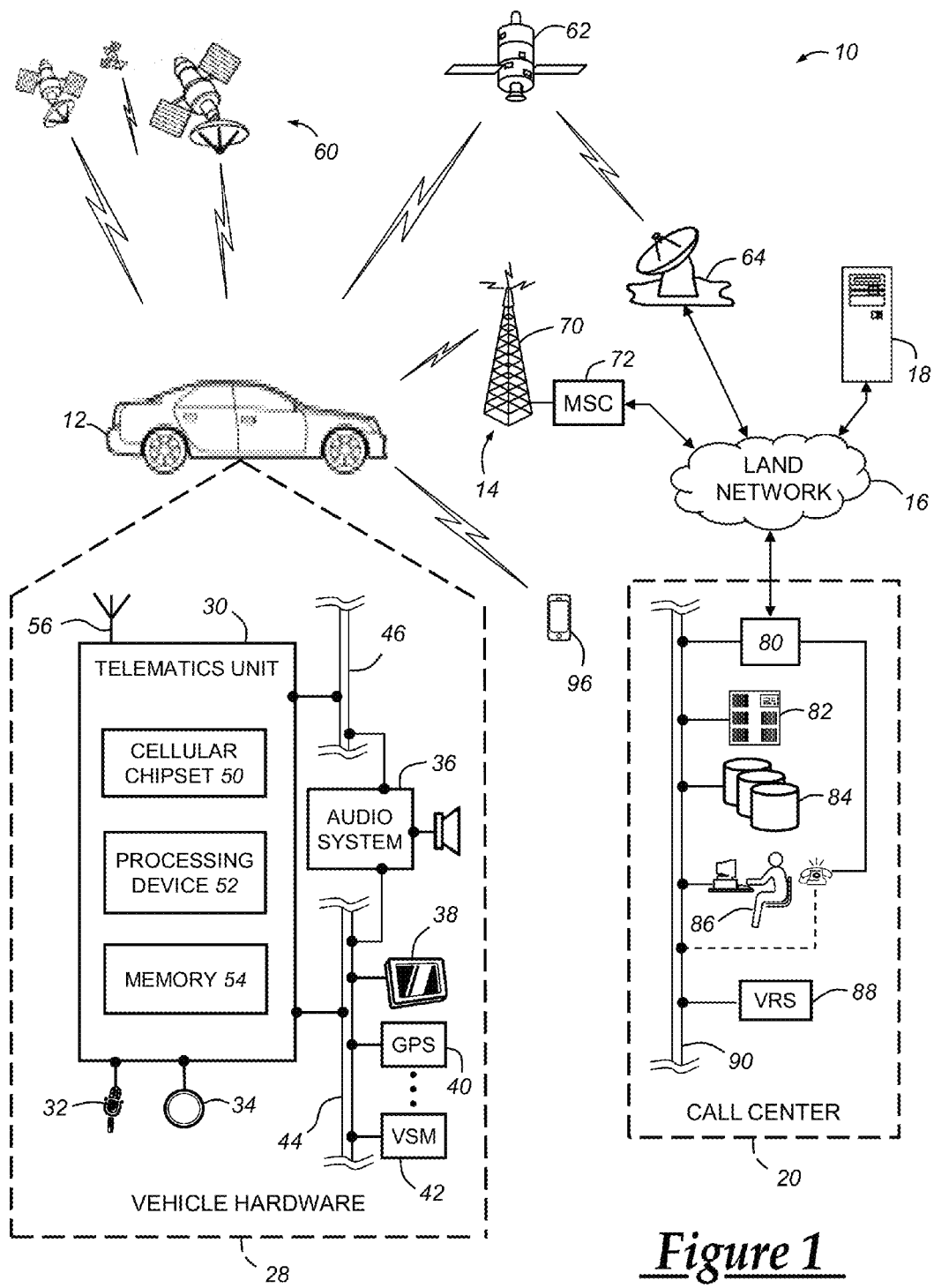
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking (e.g., the installation and any necessary service may be performed by a vehicle manufacturer or vehicle service center). This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

The operating environment may further include one or more handheld communications devices (HCDs) or mobile devices 96. The mobile device may be an electronic device which may be used to make mobile telephone calls across a wide geographic area where transmissions are facilitated by the wireless carrier system 14 (i.e., when the mobile device is connected to the wireless carrier system).

The mobile device may further include: hardware, software, and/or firmware enabling cellular telecommunications and communications via short-range wireless communication (e.g., Wi-Fi Direct and Bluetooth) as well as other mobile device applications. Such mobile device applications may include software applications, which may be preinstalled or installed by the user (or mobile device manufacturer) (e.g., having a graphical user interface or GUI). One commercial implementation of a vehicle-mobile device application may be RemoteLink™, enabling a vehicle user to communicate with the vehicle 12 and/or control various aspects or functions of the vehicle—e.g., among other things, allowing the user to remotely lock/unlock vehicle doors, turn the vehicle On/Off, check the vehicle tire pressures, fuel level, oil life, etc. RemoteLink™ may also allow the user to connect with the call center 20 or the call center advisor 86 at any time.

The hardware of the mobile device 96 may comprise: a display, a keypad (e.g., push button and/or touch screen), a microphone, one or more speakers, motion-detection sensors (such as accelerometers, gyroscopes, etc.), and a camera. The camera may include physical (or hard) optics and/or electronic imaging (optics) capability. In some implementations, the camera's functionality may be utilized as a scanner or to scan images and/or objects. This functionality may be supported by software or a software application within the mobile device, and this software may be a computer program product that includes a non-transitory computer readable medium for the mobile device. One or more software programs may be stored on the computer readable medium that include program instructions to scan an image using the camera; furthermore, the instructions may interpret or determine a value associated with the scanned image (such as a numeric, alphanumeric, hex, etc. value).

In addition to the aforementioned features, modern mobile devices may support additional services and/or functionality such as short messaging service (SMS or texts), multimedia messaging service (MMS), email, internet access, as well as business and gaming applications. Non-limiting examples of the mobile device 96 include a cellular telephone, a personal digital assistant (PDA), a Smart Phone, a personal laptop computer having two-way communication capabilities, a netbook computer, or any suitable combinations thereof. The mobile device 96 may be used inside or outside of a mobile vehicle (such as the vehicle 12 shown in FIG. 1), and may be coupled to the vehicle by wire or wirelessly (e.g., using short range wireless communication). The mobile device also may be configured to provide services according to a subscription agreement with a third-party facility or wireless/telephone service provider. It should be appreciated that various service providers may utilize the wireless carrier system and that the service provider of the telematics unit 30 may not necessarily be the same as the service provider of the mobile devices 96.

The mobile device 96 and the vehicle 12 may be used together by a person known as the vehicle user such as the driver. However, the vehicle user does not need to be the driver of the vehicle 12 nor does the vehicle user need to have ownership of the mobile device 96 or the vehicle 12 (e.g., the vehicle user may be an owner or a licensee of either or both).

Method

Figure 2:
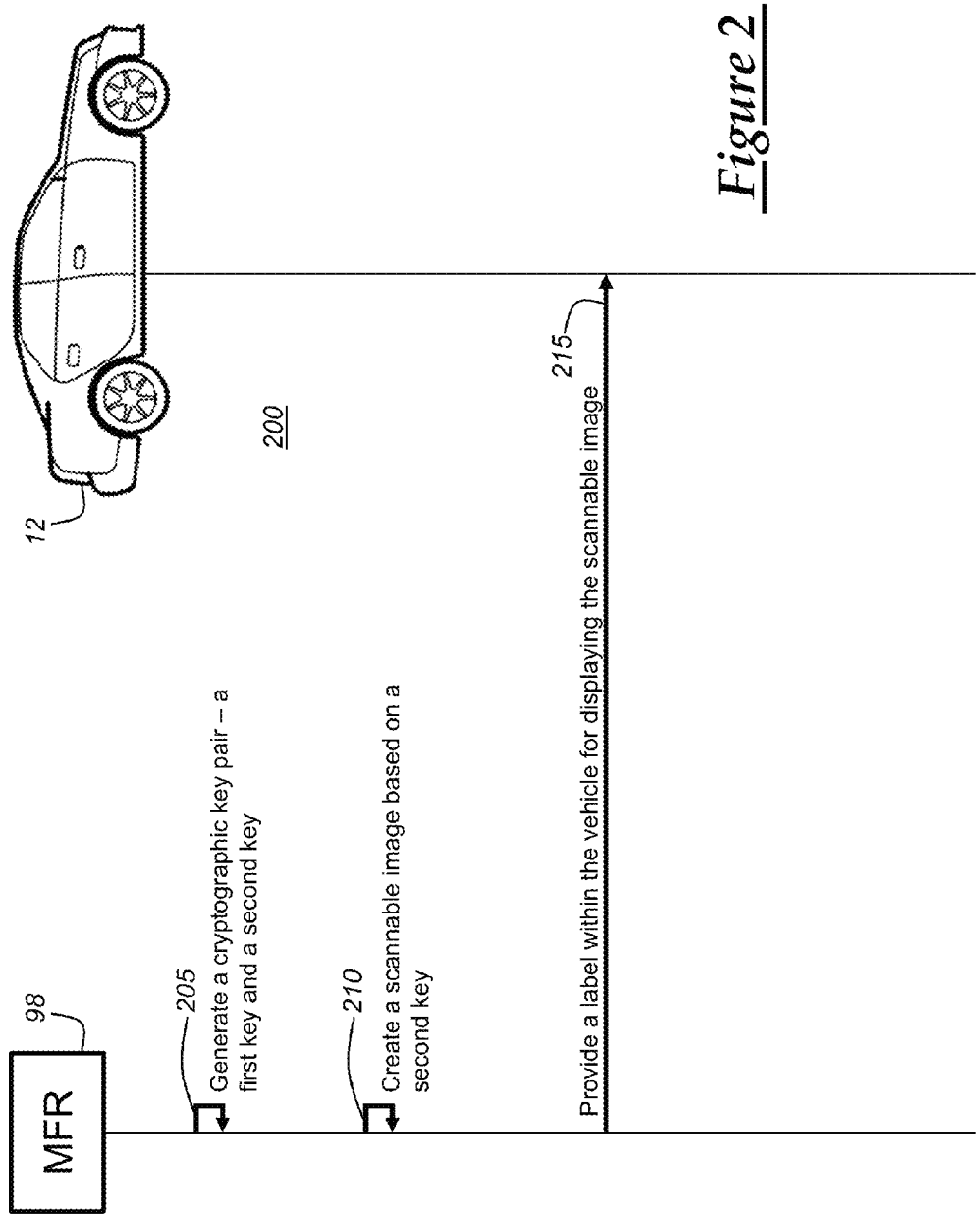
FIG. 2 is a flow diagram depicting an exemplary embodiment of the system and method.

Turning now to FIG. 2, there is depicted a flow diagram that illustrates one exemplary embodiment of a method that utilizes the present communications system. Method 200 illustrates a method of securely providing a mobile device with a cryptographic key in a vehicle and begins with step 205 where a vehicle manufacturer (MFR) or vehicle service center 98 generates a cryptographic key pair. The key pair may include a first (cryptographic) key and a second (cryptographic) key. In one embodiment, the second key may be a private key; thus, it may be desirable to prevent non-vehicle users from acquiring or using the second key. Where the key pair is according to a public key infrastructure, the first key may be a public key; and where the key pair is according to a private key infrastructure, the first key may be a private key (and in some instances may be a shared or common key). The first and/or second key may be based on a unique identifier; in some instances, the key(s) may be a prime number and/or a randomly generated character string, number, or combination thereof (e.g., where the probability of generating two like identifiers is unlikely). Both public and private key infrastructure (and key generation or creation) is known and will be appreciated by skilled artisans.

In step 210, a scannable image or mark is created based on the second key. This scannable image may be computer generated according to known programs and/or algorithms. For example, the scannable image of the second key may be a barcode which is scannable, readable, interpretable, etc. using the mobile device 96. The term barcode should be construed broadly to include any barcode such as any linear (or one-dimensional) barcode, any two-dimensional barcode, or any combinations thereof (including, e.g., first, second, third, and any future generation barcodes) (such as but not limited to: UPC, Codabar, Code 25 series, Code 39, Code 93, Code 128 series, Code 11, CPC Binary, DUN 14, EAN 2, EAN 5, EAN 8, EAN 13, GSI-128, GSI DataBar, MSI, Aztec Code, Codablock, Code 16k, Code 49, ColorCode, Color Construct Code, Compact Matrix Code, CP Code, CyberCode, DataGlyphs, Data Matrix, Datastrip Code, Dot Code A, EZcode, Grid Matrix Code, HD Barcode, High Capacity Color Barcode, HueCode, INTACTA.CODE, InterCode, JAGTAG, mCode, MiniCode, MicroPDF417, MMCC, Optar, PaperDisk, PDF417, PDMark, QR Code, QuickMark Code, SmartCode, Snowflake Code, ShotCode, SPARQCode, SuperCode, Trillcode, UltraCode, UnisCode, VeriCode, VSCode, WaterCode, just to name a few).

Having created the scannable image, the scannable image may be provided to the vehicle for display [step 215]; the scannable image may be placed or located on a label 100 in the vehicle 12. The label 100 may include a physical article or impression or a digital article. The term physical article should be construed broadly to include materials such as paper, polymer, cloth, metal, or any other material that may be affixed a physical object or component (such as the vehicle itself or a vehicle component) upon which the scannable image may be printed or reproduced. The term physical impression should also be construed broadly to include physical objects that are engraved or embossed or any similarly suitable means of making a physical marking. The term digital article should also be construed broadly to include any electronically generated image visible and/or detectable using the physical and/or electronic optics within the camera of the mobile device 96. For example, where the label is a digital article, it may be displayed and scanned from the display 38. The location of the label may include generally discrete or hidden locations such as within a vehicle compartment (e.g., on an inner glovebox wall or the glovebox door or within a console or overhead compartment) or in a vehicle operation manual (e.g., on the cover or inside page of the manual).

Providing the label having the scannable image within the vehicle may be desirable for several reasons. First, the second key is securely provided to the mobile device. For example, rather than providing the second key to the vehicle user's mobile device by wireless transmission which may be susceptible to malicious spying or attack, the second key is provided in person or directly—and presumably to a person with permission to enter the vehicle. Typically, the in-person delivery is not feasible since manufacturers of cellular equipment often are not the same as those of vehicles. This overcomes that drawback. In addition, providing the scannable image is a feasibly simple and expedient way to convey the second key at the time or moment it is desired by the user—e.g., as soon as the user with the mobile device enters the vehicle, the user may scan the image and acquire the key.

Another reason providing the scannable image within the vehicle may be desirable is that the second key may be more resistant to malicious attack when it is computer generated. This is particularly true when the second key might be based upon a user-selected password. For example, users may select a password which is more easily determined by an attacker—e.g., shorter and simpler passwords may be decyphered using a rote or systematic means. This sometimes occurs because the user wishes to be able to remember the password or easily enter it; and in this regard, the probability is higher that longer passwords may be entered incorrectly which may frustrate the vehicle/mobile device user. As previously described with regard to the scannable image, the identifier used as the basis of the second key may be long and random and thus more difficult for an attacker to decypher or determine. The length of the second key may vary; for example, in some embodiments, the length of the second key may be between 6 and 1000 characters (e.g., numerals, letters, symbols, etc.). In other embodiments, the maximum number of characters may be used according to the type of coding; e.g., in quick response (QR) coding, the identifier may be up to 7089 characters in length if the characters are limited to numerals only. If the QR coding characters are alphanumeric, the identifier may be up to 4296 characters in length. Thus, in some embodiments, the second key may contain at least 4000 characters and in other embodiments, the second key may contain at least 7000 characters.

Turning now to FIG. 3, there is shown another flow diagram illustrating a method 300 of secure communication between the vehicle 12 and the mobile device 96. The method begins at step 305 where the vehicle manufacturer or the vehicle service center 98 generates a cryptographic key pair. As in the method 200, the key pair may include a first (cryptographic) key and a second (cryptographic) key.

At step 310, the first key may be provided by the manufacturer 98 to the telematics unit 30 (e.g., the unit 30 storing the first key in its memory 54). This may occur at any time (including at the time of installation or later service or maintenance). At step 315, a scannable image may be provided within the vehicle (e.g., on the label 100 as previously described). Here again, the scannable image may be based on or associated with the second cryptographic key. At step 320, the mobile device 96 may be used to scan and receive the scannable image and then extract the second key therefrom. Upon acquiring the second key, the mobile device 96 may store the second key in its memory and thereafter use it to sign messages between it and the vehicle 12.

At step 325, the mobile device may send or transmit a message to the vehicle, and the vehicle telematics unit 30 may receive it. The message may be signed using the second key and may be any communication including commands to perform vehicle functions such as unlocking vehicle doors, starting the vehicle engine, and any other suitable command that is desirable to be performed by the user for which it may be desirable that the communication is secure.

Then, at step 330, the telematics unit 30 may decipher or decrypt the transmitted message using the first key. In instances where the message is a command to perform some vehicle function, at step 335, having authenticated the message, the telematics unit 30 then may initiate the command (e.g., to unlock the vehicle doors).

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of secure communication between a vehicle and a mobile device, comprising the steps of:
   generating a cryptographic key pair comprising at least a first cryptographic key and a second cryptographic key;
   providing the first cryptographic key to a vehicle telematics unit (VTU);
   providing within the vehicle a scannable image associated with the second cryptographic key, wherein the scannable image is readable by the mobile device using a software application installed on the mobile device;
   receiving a message from the mobile device that is signed using the second cryptographic key after the mobile device has scanned the scannable image and extracted the second key; and
   deciphering the message using the first cryptographic key.

2. The method of claim 1 wherein the scannable image includes one of a linear barcode or a two-dimensional barcode.

3. The method of claim 1 wherein the scannable image is located on a label.

4. The method of claim 3 wherein the label includes one of a physical article upon which the scannable image is reproduced, a physical component upon which the scannable image is engraved or embossed, or a digital article upon which the scannable image may be displayed electronically.

5. The method of claim 1 wherein the message includes a command to perform at least one vehicle function.

6. The method of claim 5 further comprising initiating at the telematics unit the performance of the at least one vehicle function based on the command.

7. The method of claim 5 wherein the at least one vehicle function includes locking or unlocking a vehicle door or starting a vehicle engine.

8. The method of claim 1 wherein the software application is a computer program product, comprising a non-transitory computer readable medium for the mobile device having a camera, comprising one or more software programs stored on the computer readable medium that include program instructions to scan an image using the camera, wherein the instructions determine the second cryptographic key based on the scanned image.

9. The method of claim 1 wherein the second cryptographic key is a private key.

10. The method of claim 9 wherein the first cryptographic key and the second cryptographic keys are shared keys according to a private key infrastructure.

11. The method of claim 1 wherein the second cryptographic key is randomly generated.

12. The method of claim 1 wherein the second cryptographic key contains at least 4000 characters.

13. The method of claim 12 wherein the second cryptographic key contains at least 7000 characters.

\* \* \* \* \*